US012766926B2

(12) United States Patent
Nistler

(10) Patent No.: US 12,766,926 B2
(45) Date of Patent: Oct. 20, 2026

(54) SYSTEM AND METHOD FOR FUEL EFFICIENT AUTOMATIC TEMPERATURE CONTROL

(71) Applicant: CNH Industrial America LLC, New Holland, PA (US)

(72) Inventor: Jonathan Nistler, Moorhead, MN (US)

(73) Assignee: CNH Industrial America LLC, New Holland, PA (US)

( * ) Notice: Subject to any disclaimer, the term of this patent is extended or adjusted under 35 U.S.C. 154(b) by 354 days.

(21) Appl. No.: 18/461,153

(22) Filed: Sep. 5, 2023

(65) Prior Publication Data

US 2025/0074153 A1 Mar. 6, 2025

(51) Int. Cl.

*B60H 1/32* (2006.01)
*B60H 3/02* (2006.01)

(52) U.S. Cl.

CPC ......... *B60H 1/3208* (2013.01); *B60H 1/3213* (2013.01); *B60H 3/024* (2013.01); *B60H 2001/325* (2013.01); *B60H 2001/3251* (2013.01); *B60H 2001/3252* (2013.01); *B60H 2001/3255* (2013.01); *B60H 2001/3257* (2013.01); *B60H 2001/326* (2013.01); *B60H 2001/3263* (2013.01); *B60H 2001/3277* (2013.01)

(58) Field of Classification Search

CPC ............................................. B60H 2001/3261
See application file for complete search history.

(56) References Cited

U.S. PATENT DOCUMENTS

| | | | | |
|---|---|---|---|---|
| 4,681,153 A * | 7/1987 | Uchida | G05D 23/1917 | 165/204 |
| 4,730,662 A * | 3/1988 | Kobayashi | B60S 1/54 | 165/204 |
| 5,117,646 A * | 6/1992 | Nose | F25B 49/022 | 62/181 |
| 5,120,270 A * | 6/1992 | Kato | B60H 1/00985 | 454/126 |

(Continued)

FOREIGN PATENT DOCUMENTS

| | | |
|---|---|---|
| GB | 2 593 705 B | 3/2022 |
| KR | 20150086659 | 7/2015 |
| WO | WO-2023/286023 | 1/2023 |

*Primary Examiner* — Nelson J Nieves
(74) *Attorney, Agent, or Firm* — Foley & Lardner LLP

(57) ABSTRACT

Systems and method relate to a fuel efficient automatic temperature control system. The system includes a climate control system configured to heat or cool air. The climate control system includes a condenser and a variable-speed fan. A first sensor provides vent-air information indicative of a condition of the air. An automatic temperature controller receives an indication of a desired temperature, receives the vent-air information, determines whether the variable-speed fan should operate at a maximum fan speed based on at least the desired temperature and the vent-air information and determines whether a dehumidifying operation is requested. If the variable-speed fan is required to operate at the maximum fan speed or a dehumidifying operation is requested, the fan operates at the maximum speed. If the variable-speed fan is not required to operate at the maximum fan speed and a dehumidifying operation is not requested, the fan operates below the maximum fan speed.

8 Claims, 7 Drawing Sheets

(56) References Cited

U.S. PATENT DOCUMENTS

| | | | | |
|---|---|---|---|---|
| 5,511,724 | A * | 4/1996 | Freiberger | G05D 23/1917 454/75 |
| 5,516,041 | A * | 5/1996 | Davis, Jr. | B60H 1/00814 236/44 C |
| 5,572,877 | A * | 11/1996 | Ikeda | B60H 1/00821 62/155 |
| 5,669,226 | A * | 9/1997 | Kurahashi | G05D 23/1917 236/78 D |
| 6,668,917 | B1 * | 12/2003 | Zeng | B60H 1/00864 165/240 |
| 7,900,462 | B2 | 3/2011 | Hegar et al. | |
| 7,988,543 | B2 | 8/2011 | Major | |
| 8,179,084 | B2 | 5/2012 | Kumar et al. | |
| 8,714,116 | B2 | 5/2014 | Hartman et al. | |
| 8,948,966 | B2 * | 2/2015 | Kim | F25B 29/003 454/75 |
| 9,388,750 | B2 | 7/2016 | Be et al. | |
| 9,428,035 | B2 | 8/2016 | Eisenhour | |
| 9,817,631 | B2 | 11/2017 | Pierfelice | |
| 9,862,248 | B2 | 1/2018 | Eisenhour et al. | |
| 10,340,737 | B2 | 7/2019 | Jung et al. | |
| 10,556,598 | B2 | 2/2020 | Petrak et al. | |
| 11,485,350 | B2 | 11/2022 | Wrobel | |
| 11,592,529 | B2 | 2/2023 | Diehl et al. | |
| 11,598,244 | B2 | 3/2023 | Ghorpade et al. | |
| 2003/0073400 | A1 * | 4/2003 | Dahl | B62D 49/04 454/139 |
| 2003/0089788 | A1 * | 5/2003 | Ohga | F24F 11/77 236/91 C |
| 2004/0079096 | A1 * | 4/2004 | Itoh | B60H 1/00835 62/93 |
| 2004/0201481 | A1 * | 10/2004 | Yoshinori | B60H 1/00 297/284.6 |
| 2005/0178132 | A1 * | 8/2005 | Sakaguchi | F25B 49/027 62/181 |
| 2007/0079621 | A1 * | 4/2007 | Lee | B60H 1/3216 62/228.4 |
| 2008/0034762 | A1 * | 2/2008 | Yoshii | B60H 1/00828 62/118 |
| 2008/0034764 | A1 * | 2/2008 | Iwasaki | B60H 1/00864 62/159 |
| 2008/0073057 | A1 * | 3/2008 | Kojima | B60H 1/00742 62/179 |
| 2008/0292470 | A1 * | 11/2008 | Sawada | B60H 1/3208 417/15 |
| 2008/0315000 | A1 * | 12/2008 | Gorthala | G05D 22/02 236/94 |
| 2012/0180393 | A1 * | 7/2012 | Suzuki | B60H 1/00692 49/348 |
| 2012/0312520 | A1 * | 12/2012 | Hoke | B60N 2/5628 219/217 |
| 2015/0093981 | A1 | 4/2015 | Fusco et al. | |
| 2016/0075212 | A1 * | 3/2016 | Morishita | B60H 1/00899 165/41 |
| 2018/0215231 | A1 * | 8/2018 | Porras | B60H 1/323 |
| 2018/0319249 | A1 * | 11/2018 | Wong | B60H 1/00978 |
| 2019/0292975 | A1 | 9/2019 | Hou et al. | |
| 2020/0223459 | A1 | 7/2020 | Wolff et al. | |
| 2023/0249515 | A1 * | 8/2023 | Gutowski | B60H 1/00778 701/36 |
| 2025/0354708 | A1 * | 11/2025 | Bonnet | F24F 11/63 |

* cited by examiner

SYSTEM AND METHOD FOR FUEL EFFICIENT AUTOMATIC TEMPERATURE CONTROL

BACKGROUND

The present disclosure relates generally to climate control, HVAC, air conditioning and heating systems. More specifically, the present disclosure relates to systems and methods for fuel efficient automatic temperature control to reduce noise and increase fuel efficiency by reducing an air flow speed or a fan rate.

SUMMARY

One embodiment relates to a system for fuel efficient automatic temperature control. The system includes a climate control system configured to heat or cool air delivered to a cab of the vehicle, a first sensor configured to provide a vent-air information indicative of a condition of the air delivered to the cab, and an automatic temperature controller. The climate control system includes a condenser and a variable-speed fan operable at multiple fan speeds. The automatic temperature controller includes one or more processors including one or more memory devices coupled to the one or more processors. The one or more memory devices are configured to store instructions thereon that, when executed by the one or more processors, cause the one or more processors to: receive an indication of a desired temperature, receive the vent-air information, determine whether the variable-speed fan is required to operate at a maximum fan speed based on at least the desired temperature and the vent-air information, and determine whether a dehumidifying operation is requested. In response to determining that the variable-speed fan is required to operate at the maximum fan speed or that the dehumidifying operation is requested, the automatic controller operates the variable-speed fan at the maximum fan speed. However, in response to determining that the variable-speed fan is not required to operate at the maximum fan speed and that the dehumidifying operation is not requested, the automatic temperature controller operates the variable-speed fan below the maximum fan speed.

Another embodiment relates to an additional system for fuel efficient automatic temperature control for a vehicle. The system includes a climate control system configured to heat or cool air delivered to a cab of the vehicle, a first sensor configured to provide a vent-air information indicative of a condition of the air delivered to the cab, a second sensor configured to provide climate control system information. and an automatic temperature controller. The automatic temperature controller is communicatively coupled to the climate control system, the first sensor, and the second sensor. The climate control system includes a variable-speed fan operable at multiple fan speeds. The automatic temperature controller is configured to control operation of the variable-speed fan. Additionally, the automatic temperature controller comprises one or more processors including one or more memory devices coupled to the one or more processors. The one or more memory devices are configured to store instructions thereon that, when executed by the one or more processors, cause the one or more processors to: operate the climate control system at a maximum fan speed, determine whether the variable-speed fan is required to operate at the maximum fan speed based on at least a desired temperature and the vent-air information, determine whether a dehumidifying operation is requested, and operate the climate control system at a fan speed slower than the maximum fan speed while the maximum fan speed is not required and the dehumidifying operation is not requested.

Still another embodiment relates to methods for fuel efficient automatic temperature control. The method includes the steps of receiving a desired temperature by a controller, receiving a vent-air information by the controller, determining, by the controller, whether a variable-speed fan is required to operate at a maximum fan speed based on at least the desired temperature and the vent-air information, determining, by the controller, whether a dehumidifying operation is requested, in response to determining that the variable-speed fan is required to operate at the maximum fan speed or that the dehumidifying operation is requested, operating the variable-speed fan at the maximum fan speed by the controller, and in response to determining that the variable-speed fan is not required to operate at the maximum fan speed and that the dehumidifying operation is not requested, operating the variable-speed fan below the maximum fan speed by the controller.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a system for fuel efficient automatic temperature control includes a climate control system configured to heat or cool air delivered to a cab of the vehicle. The climate control system includes at least a condenser and a variable-speed fan operable at multiple fan speeds that blows air over the condenser to cool a refrigerant or coolant. A first sensor is configured to provide vent-air information indicative of a condition of the air delivered to the cab. For example, in some embodiments, the first sensor includes a temperature or humidity sensor that measures the temperature and moisture content of air in a vent of the vehicle or otherwise directed to the cab. The system also includes an automatic temperature controller. The automatic temperature controller includes one or more processors including one or more memory devices coupled to the one or more processors. The one or more memory devices are configured to store instructions thereon that, when executed by the one or more processors, cause the one or more processors to control the variable speed fan and/or the climate control system in a manner that increases fuel efficiency and improves operator comfort (e.g., reduces fan noise, vehicle vibration, etc.) by regulating or limiting air flow in the vehicle.

For example, in some embodiments, the controller receives vent-air information, determines whether the variable-speed fan is required to operate at a maximum fan speed based on at least the desired temperature and the vent-air information, and determines whether a dehumidifying operation is requested. In response to determining that the variable-speed fan is required to operate at the maximum fan speed or that the dehumidifying operation is requested, the automatic controller operates the variable-speed fan at the maximum fan speed. However, in response to determining that the variable-speed fan is not required to operate at the maximum fan speed and that the dehumidifying operation is not requested, the automatic temperature controller operates the variable-speed fan below the maximum fan speed.

Overall Vehicle

Figure 1:
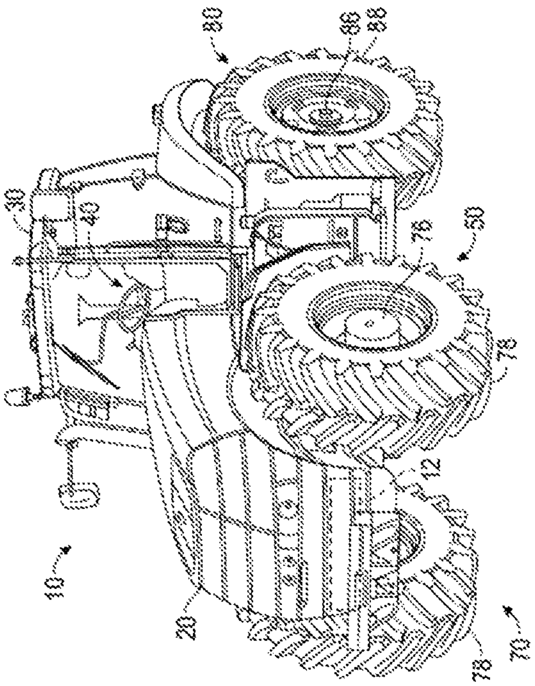
FIG. 1 is a perspective view of a vehicle, according to an exemplary embodiment.
Figure 2:
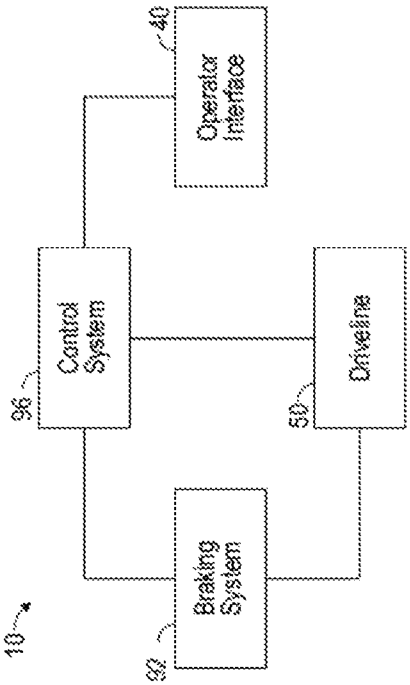
FIG. 2 is a schematic block diagram of the vehicle of FIG. 1, according to an exemplary embodiment.
Figure 3:
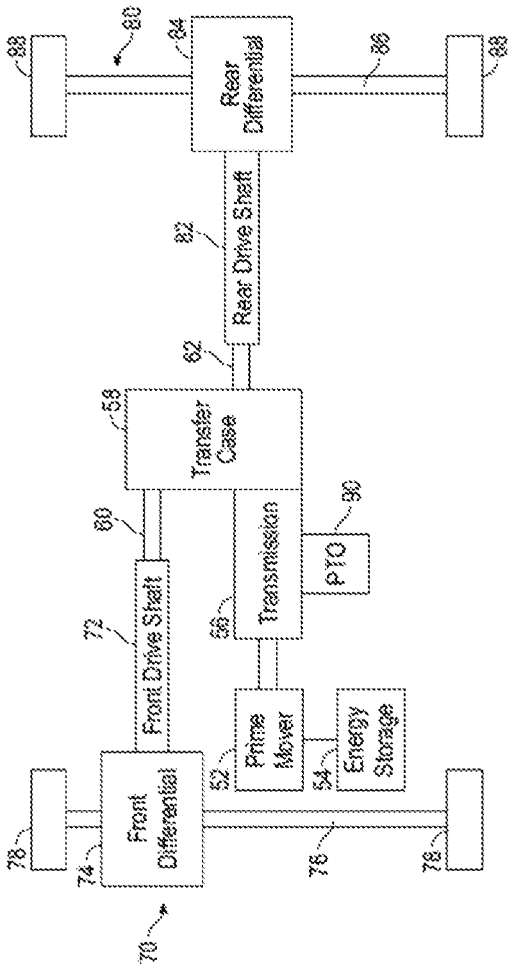
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 92, coupled to one or more components of the driveline 50 to facilitate selectively braking the one or more components of the driveline 50; and a vehicle control system that includes a climate control system, shown as climate control system 96, coupled to the operator interface 40, the driveline 50, and the braking system 92. In other embodiments, the vehicle 10 includes more or fewer components.

The chassis of the vehicle 10 may include a structural frame (e.g., the frame 12) formed from one or more frame members coupled to one another (e.g., as a weldment). Additionally or alternatively, the chassis may include a portion of the driveline 50. By way of example, a component of the driveline 50 (e.g., the transmission 52) may include a housing of sufficient thickness to provide the component with strength to support other components of the vehicle 10.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

For example, the operator interface 40 may include one or more knobs, levers, buttons, switches and the like (e.g., arranged on a control panel, arranged on a dashboard, located on or near the one or more vents, located on a center console, etc.) to control climate settings within the cab 30. In other embodiments, a touchscreen display may be included to list climate control settings that allow the operator to adjust air flow speed within the cab 30, the air temperature, and airflow direction. The operator interface 40 may also have additional features such as a mode selector (for selecting between different cooling modes like "automatic," "low noise mode," etc.), a recirculation setting (to circulate interior air instead of outside air), and dehumidify/defrost/defog controls.

The operator interface 40 may include temperature controls represented by dials or buttons that allow the operator to set the desired cab temperature. For example, the cab 30 may include knobs, dials, and the like with markings indicating hot and cold ranges, or it may display the selected temperature on a digital screen. By adjusting these controls, the operator can increase or decrease the volume of air entering the cab 30, the mixing of the air before it enters to cab 30, and other climate control settings to achieve a desired comfort level. One or more of these operator selected controls or climate control settings may be overridden by a system for fuel efficient automatic temperature control 100. For example, to increase fuel efficiency, the system for fuel efficient automatic temperature control 100 may reduce air flow speed to intentionally diminish the maximum operating power of the climate control system 96 when maximum operating conditions (e.g., maximum fan speed, minimum air temperature, etc.) are not required.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 92 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 92 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Exemplary HVAC/Climate Control System

Figure 4:
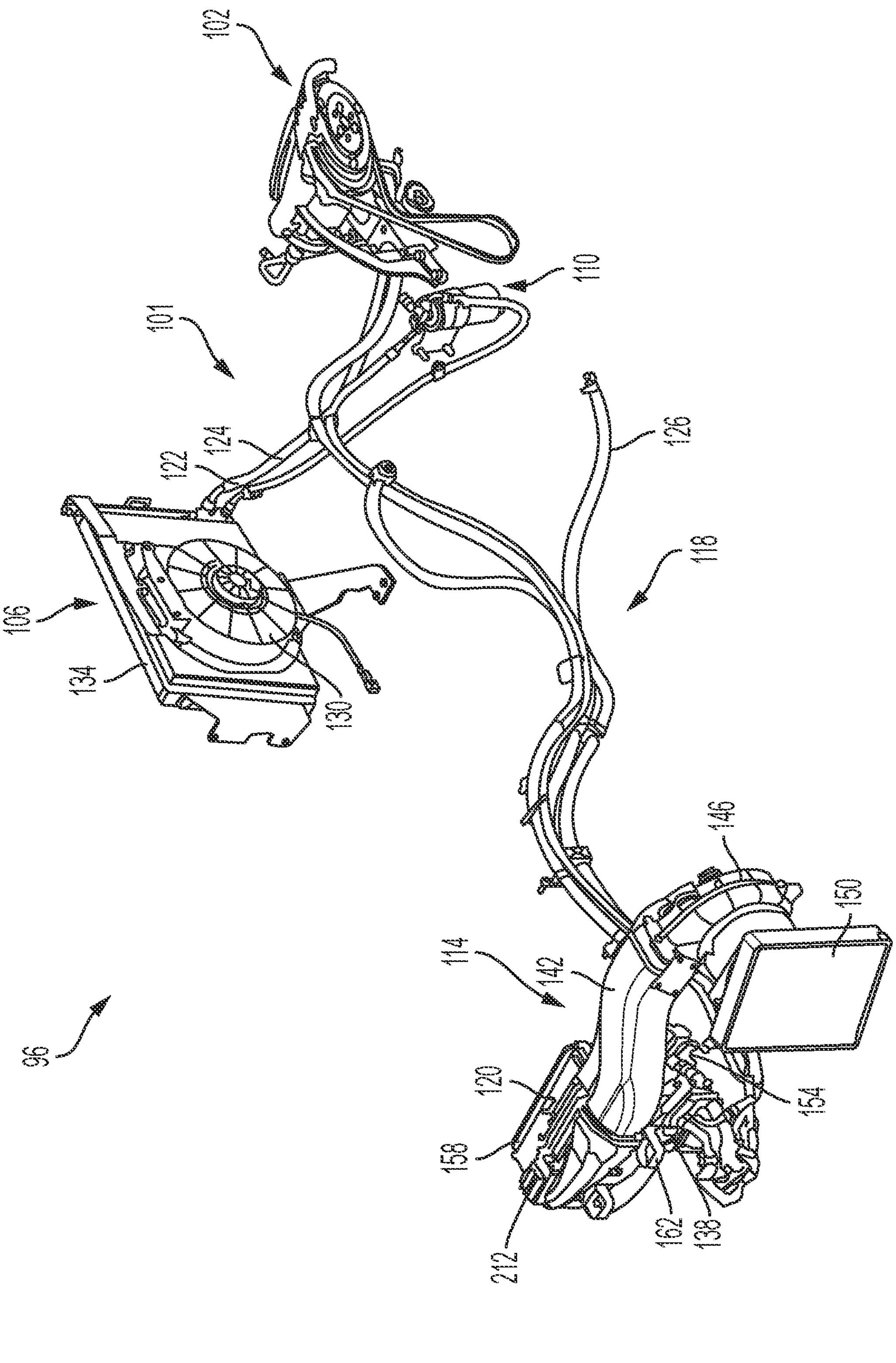
FIG. 4 is an exemplary climate control system configured to interoperate with a system for fuel efficient automatic temperature control.

As shown in FIG. 4, the systems and methods disclosed herein may operate on an exemplary climate control system 96 of a vehicle 10. The exemplary climate control system 96 is configured to heat or cool air delivered to the cab 30 of the vehicle 10. The exemplary climate control system 96 includes a refrigeration circuit 101 configured to control the temperature of the air delivered the cab 30. The refrigeration circuit 101 may include a compressor 102, a condenser 106, a receiver-dryer 110, and an air conditioning-heating unit 114, in thermal communication via lines 118. In some embodiments, the refrigeration circuit 101 includes only a portion or limited parts of the air conditioning-heating unit 114 (e.g., an evaporator 120 coupled to or assembled as a component of the air conditioning-heating unit 114 and in fluid communication with refrigerant lines 122, one or more heat exchangers or mixing channels within the air conditioning-heating unit 114 in thermal communication with lines 118, etc.). The lines 118 may include refrigerant lines 122 to circulate a refrigerant 124 such as freon, R-134a, R-1234yf, or another suitable chemical compound to selectively heat or cool the temperature of air. Some lines 118 may be coolant lines 126 (e.g., engine coolant lines, prime mover coolant lines, lines connected to the heater core of the prime mover, etc.) configured to circulate a coolant from the prime mover 52 or another components to the air conditioning-heating unit 114. The coolant may include antifreeze coolants, nitrate-free coolants, inorganic additive technology (IAT) coolants, organic additive technology (OAT) coolants, or other suitable coolants. The coolant lines 126 may circulate warm or hot coolant to heat a quantity of air in the air conditioning-heating unit 114 which is then mixed with a separate quantity of air cooled by the refrigerant lines 122. In this way, the exemplary climate control system 96 may vary and alter the ratio of warm and cold air mixed to create a volume of air at a moderate temperature to be delivered to the cab 30.

While the components, configuration, and flow directions/pathways of the exemplary climate control system 96 are discussed in more detail below, it is understood that variations, substitutions, and additional configurations of the components, lines 118, and exemplary climate control system 96 are interoperable with the systems and methods for fuel efficient automatic temperature control 100 disclosed herein. For example, in some variations, the exemplary climate control system 96 may include an accumulator in place of or in conjunction with the receiver-drier 110.

In some embodiments, the compressor 102 is configured to pressurize the refrigerant 124 from a low pressure state to a high pressure state. In this way, the compressor 102 may define a high pressure side (e.g., at the outlet of the compressor 102) and a lower pressure side (e.g., at the inlet of the compressor 102) of the refrigeration circuit 101. As the refrigerant 124 is pressurized, its temperature increases and it is conveyed via lines 118 from the outlet of the compressor 102 and to the condenser 106. In some embodiments, the compressor 102 receives a relatively cool, low pressure vapor (e.g., refrigerant 124, coolant, etc.) and outputs the same as a warmer, higher pressure vapor. The compressor 102 may be a reciprocating compressor, scroll compressor, rotary compressor or another suitable compressor and may be sized to circulate a refrigerant 124 and/or coolant at a sufficient rate to maintain flow through the exemplary refrigeration circuit 98. The compressor 102 may be powered by a belt or other linkage coupling the compressor 102 to the prime mover 52.

The condenser 106 is configured to receive hot refrigerant 124 vapor from the compressor 102 at an inlet of the condenser 106. The condenser 106 includes a variable-speed fan 130 and a first heat exchanger 134. The variable-speed fan 130 is configured to blow air across the first heat exchanger 134 while pipes, channels, tubes, etc. route the refrigerant 124 in a generally winding path through the condenser 106. The variable speed fan 130 operates as a cooling fan to reject/dissipate heat from the vehicle 10 and the climate control system 96.

For example, the variable speed fan 130 may be located externally from or outside the cab 30 of the vehicle 10. The variable speed fan 130 may be located proximate to the prime mover 52 and be powered by a hydraulic system (e.g., a hydraulic system connected to the prime mover 52, an engine, etc.). The variable speed fan 130 may be responsible for cooling the engine and dissipating excess heat generated during operation of the vehicle 10, the prime mover 52, the climate control system 96, etc. The variable speed fan 130 may require significant input power compared to other components of the climate control system 96. For example, the variable speed fan 130 may require a hydraulic load of 10 horsepower, 20 horsepower, and the like to circulate a substantial amount of air at a sufficient rate to dissipate heat.

The climate control system 96 may also include a blower (e.g., the blower 146) configured to deliver air cooled/heated by the variable speed fan 130 to the cab 30 and to an operator of the vehicle 10. For example, the blower may be located inside or proximate to the cab 30. The blower may be driven by an electric motor, an electric power source, a non-hydraulic power source, etc. In this way, the load (e.g., electrical load) of the blower may be smaller than the load required to operate the variable speed fan 130. In some embodiments, one or more blowers (e.g., blower 146) is responsible for circulating air within the HVAC system, moving air through the ductwork and directing it into the vehicle cab 30, while the variable speed fan 130 is responsible for providing larger and sustained air flow for heat dissipation. The blower is designed to generate sufficient airflow to ensure proper ventilation and distribute conditioned air evenly throughout the cab 30. Although it requires power (e.g. electrical power) to operate, its load may be relatively small compared to that of the variable speed fan 130.

The variable-speed fan 130 is also configured to operate at more than one fan speed (e.g., may move air at multiple volumetric flow rates, may increase or decrease the rotational speed of fan blades, etc.). In some embodiments, the variable-speed fan 130 may include a bladed-fan, an electric blower, a square-axial fan, or another suitable air moving device. In this way, as the refrigerant 124 flows through the condenser 106, the condenser 106 is configured to convert the refrigerant 124 from a hot high pressure vapor to a generally cooler, high pressure liquid. The condenser 106 may be mounted to a radiator, roof, side wall, back compartment, or other suitable portion of the vehicle 10. The variable-speed fan 130 may also be configured to draw air over other components of the vehicle 10 such as axle coolers, an engine radiator, transmission coolers, hydraulic oil coolers, etc. In this way, more than one sub-system of the vehicle 10 may simultaneously demand a particular fan speed from the variable-speed fan 130.

For example, while the climate control system 96 may demand little to no fan speed in moderate climates (e.g., around 60-70 degrees Fahrenheit arid outdoor temperatures), the engine radiator or hydraulic oil cooler may demand a high or maximum fan speed as components of the vehicle 10 heat up while in use. Multiple vehicle subsystems may send signals or communicate with the system for fuel efficient automatic temperature control 100 such that the system 100 may give fan-speed priority to the sub-system that is demanding the most fan speed. Alternatively, the system 100 may give priority to limiting/slowing the fan speed when possible. For example, the system for fuel efficient automatic temperature control 100 may limit the fan speed (e.g., set fan speed at half of maximum fan speed, set fan speed at designated volumetric flow rate that produces fan noise under a certain decibel limit, set fan speed at designated speed that results in a certain fuel consumption use by the fan, etc.) until conditions of other sub-systems (e.g., a radiator temperature, a hydraulic oil temperature) meet or exceed a threshold value before allowing the fan speed to increase to a maximum fan speed or increase above the designated lower fan speed. In this way, the system for fuel efficient automatic temperature control 100 may limit the fuel cost and noise of the variable-speed fan 130 during operational periods when maximum or ideal fan speeds are not required (e.g., when a lower cooling fan speed will achieve a desired temperature and no other sub-systems require air from the fan).

In an exemplary embodiment, refrigerant 124 exits the outlet of the condenser 106 as a high pressure and lower temperature liquid compared to its state at the inlet of the condenser 106. The refrigerant 124 may be circulated through lines 118 to the receiver-dryer 110. The receiver-dryer 110 includes an inlet, an outlet, and a casing (e.g., cylindrical casing, rectangular casing, etc.) to house its internal components and to receive and circulate the refrigerant 124. The receiver-dryer 110 contains a moisture absorbent (e.g., silica gel, activated alumina, molecular sieves) that acts as a desiccant to remove moisture from the refrigerant 124 as its flows through the receiver-dryer 110. As the high-pressure refrigerant 124 flows into the receiver-dryer 110, the moisture absorbent removes moisture present in the refrigerant 124 (e.g., to prevent the formation of ice crystals, corrosion, and other issues caused by moisture within the climate control system 96). The receiver-dryer 110 may also include an internal filter to remove contaminants, dirt, debris, oil, or metal particles from the refrigerant 124. In such embodiments, the refrigerant 124 flows through the internal filter which captures and holds contaminants present in the refrigerant 124, preventing damage that these particles could cause if allowed to circulate further into the climate control system 96. The receiver-dryer 110 may also store excess refrigerant 124 within its casing when the refrigerant 124 is not immediately required by the exemplary climate control system 96. In this way, the receiver-dryer 110 contributes to the smooth and continuous flow of refrigerant 124 through the exemplary climate control system 96.

In some embodiments, the refrigerant 124 flows from the outlet of the receiver-dryer 110 via lines 118 and enters the inlet of an expansion valve 138. Like the compressor 102, the expansion value 138 may separate a high-pressure side of the refrigeration circuit 101 from a low-pressure side. The expansion valve 138 is configured to control the amount of refrigerant 124 entering the air conditioning-heating unit 114 (e.g., the evaporator 120 of the air-conditioning heating unit 114). The expansion valve 138 includes a housing (e.g., a metal body, an alloy casing) which contains its internal components. The expansion valve 138 housing includes an inlet port and an outlet port that connect to the lines 118. The expansion valve 138 may include a valve screen to prevent debris, contaminants, etc. from entering the expansion valve 138. The expansion valve 138 also includes a metering device that controls the flow rate and pressure of the refrigerant 124 as the refrigerant 124 flows through the expansion valve 138. The metering device may adjust an internal passage or orifice to control the flow of refrigerant 124 in the refrigeration circuit 101. In some embodiments, the expansion value 138 may be coupled to a capillary tube and a thermal bulb. The thermal bulb may be located at the exit of the evaporator 120 and expand and contract to adjust the flow of refrigerant 124 through the metering device via the capillary tube in response to changes in cooling demand. As high-pressure liquid refrigerant 124 enters the expansion valve 138, the metering device restricts its flow, causing a pressure drop. The refrigerant 124 then expands into a low-pressure mixture of liquid and vapor as it leaves the expansion valve 138, resulting in rapid cooling of the refrigerant 124.

In some embodiments, the air conditioning-heating unit 114 includes the evaporator 120, an air duct 142, a blower 146, a cab air filter 150, and a heater valve 154. In some embodiments, air passes through the cab air filter 150 before being delivered to the cab 30. In other embodiments, the expansion valve 138 may be coupled to, integral with, or structured as a component of the air conditioning-heating unit 114 (e.g., may be included within the air conditioning-heating unit 114, may be fastened or integrally formed with the air conditioning-heating unit 114, etc.). The air conditioning-heating unit 114 also includes input ports and output ports configured to receive and circulate at least one of a refrigerant 124 (e.g., the input and output ports connect to refrigerant lines 122) or a coolant (e.g., the input and output ports connect to coolant lines 126). In other embodiments, both refrigerant lines 122 and coolant lines 126 connect to various inlet and outlet ports of the air conditioning-heating unit 114.

The evaporator 120 is configured to cool and dehumidify air to be delivered to the cab 30. The evaporator 120 may be located in the passenger compartment, in a side or center compartment of the vehicle 10, or at another suitable location on the vehicle 10. The evaporator 120 includes a second heat exchanger 158 (e.g., piping, a coil of finned tubes, etc.). After leaving the expansion valve 138 at a reduced temperature and pressure, the refrigerant 124 enters and/or flows through the evaporator 120. The blower 146 draws air over the second heat exchanger 158, and the refrigerant 124 evaporates within the evaporator 120 and absorbs heat from the air passing over the second heat exchanger 158. In this way, the evaporator 120 cools air to be delivered to the cab 30. As the evaporator 120 cools the air, moisture in the air may condense on the second heat exchanger 158. The air conditioning-heating unit 114 may include a drain line 162 configured to collect condensed moisture and channel it out of the air conditioning-heating unit 114.

Figure 5:
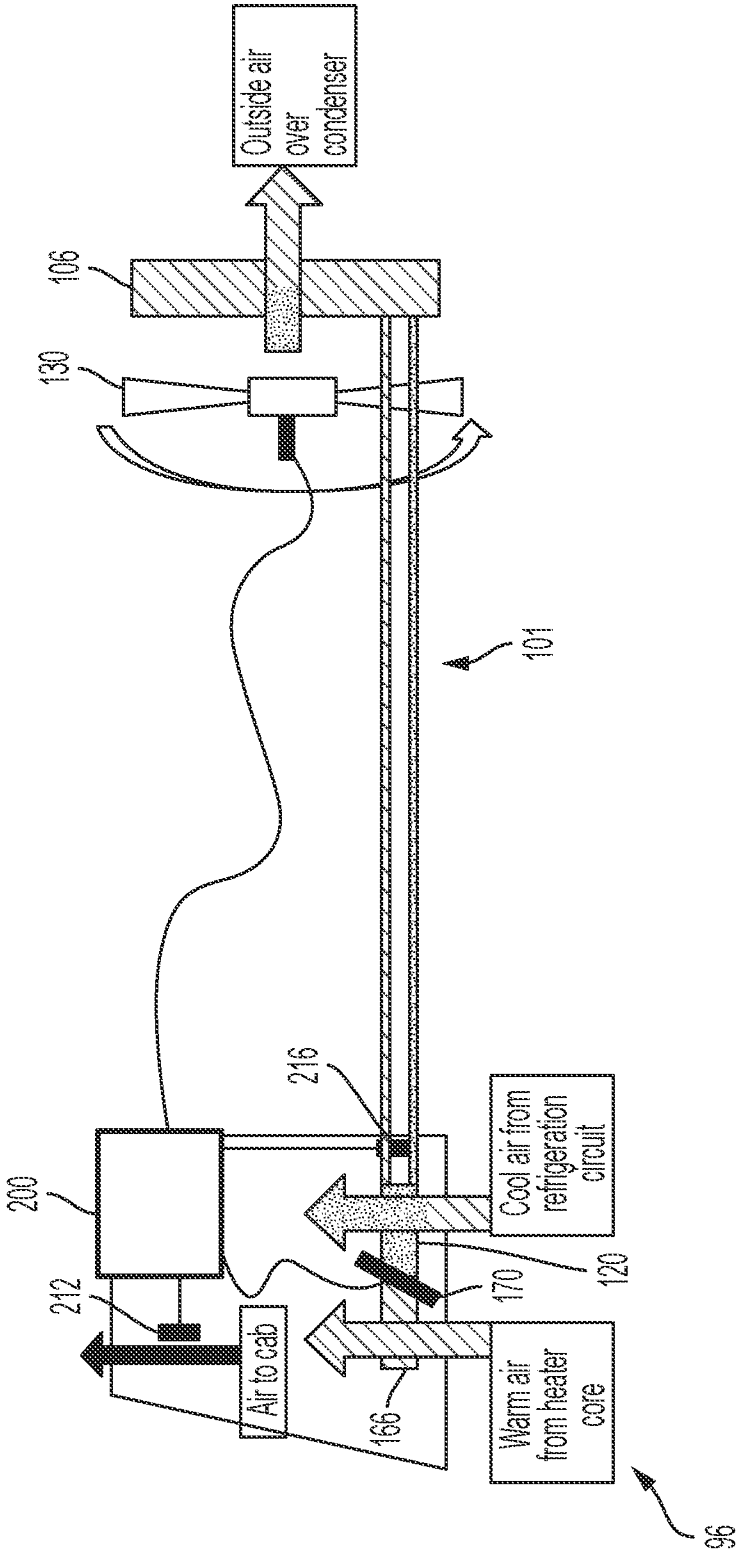
FIG. 5 is a component diagram showing exemplary components of a system for fuel efficient automatic temperature control.

In some embodiments, coolant lines 126 connect to the heater valve 154 and circulate coolant through the air conditioning-heater unit 114. As shown in FIG. 4 and FIG. 5, air may be heated as it passes over a heater core 166 of the air conditioning-heating unit 114, over the coolant lines 126, and/or over an optional third heat exchanger. The air conditioning-heater unit 114 may both heat (e.g., via the heater core 166 and coolant lines 126) and cool (e.g., via the refrigeration circuit 101 and evaporator 120) quantities of air mix the quantities of heated and cooled air together via a mixing door 170.

Exemplary Systems for Fuel Efficient Automatic Temperature Control

Figure 6:
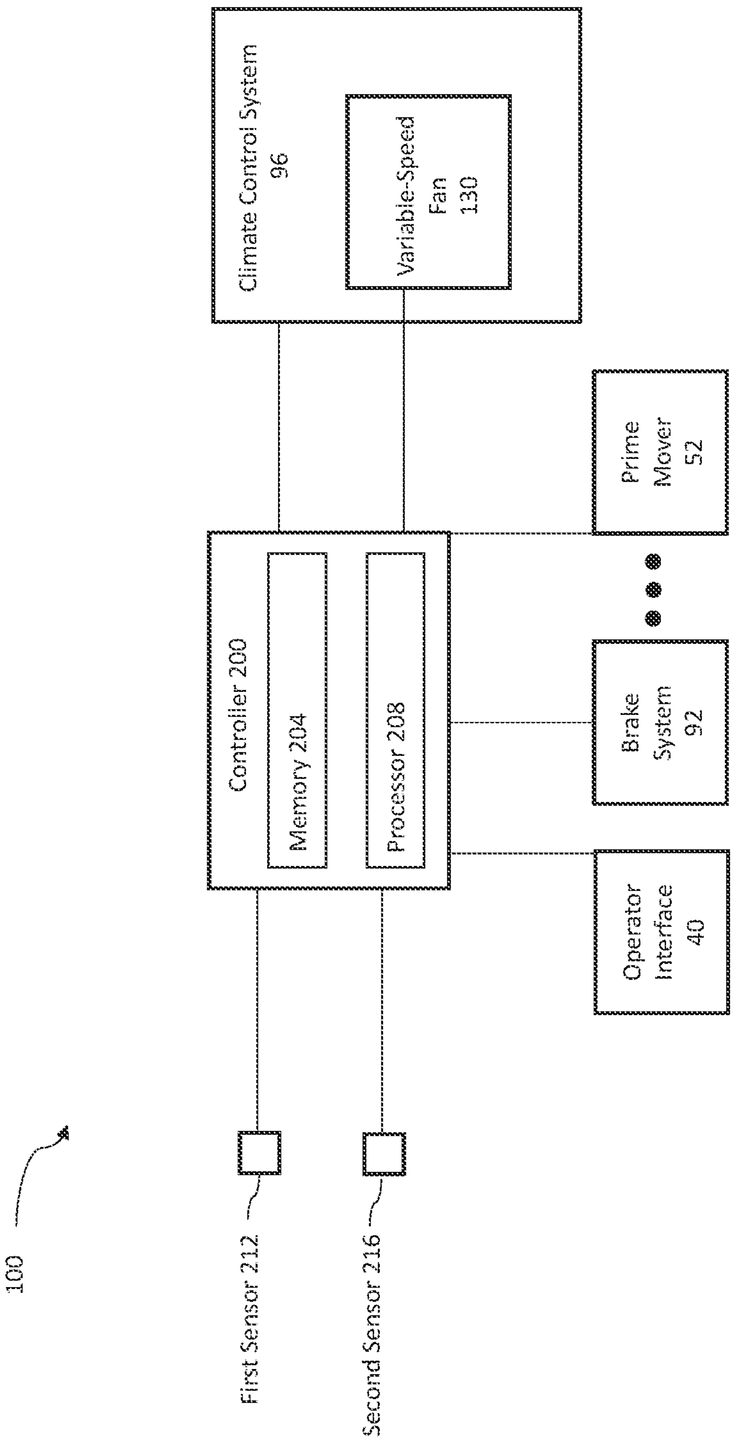
FIG. 6 is a schematic block diagram showing an exemplary system for fuel efficient automatic temperature control.

Focusing now on FIG. 5 and FIG. 6, the system for fuel efficient automatic temperature control 100 includes a climate control system 96 having a variable-speed fan 130, a controller 200, and a first sensor 212 (e.g., a vent-air sensor). The controller 200 includes a memory device, shown as memory 204 and processing circuitry (e.g., a processor 208). The processor 208 may be configured to execute one or more instructions stored on the memory 204 to perform one or more of the processes described herein. As shown in FIGS. 5 and 6, the controller 200 is communicatively coupled to at least one of the climate control system 96 or the variable-speed fan 130. In some embodiments, the system 100 also includes a second sensor 216 (e.g., a climate control system sensor). The system 100 may be communicatively coupled to other sub-systems of the vehicle 10 such as the brake system 92, prime mover 52, a radiator sub-subsystem, etc. in order to receive requests/demand from other sub-systems regarding operation of the variable-speed fan 130 (e.g., the controller 200 may be in communication with a control unit of the prime mover 52 such that the controller 200 is notified/receives a signal if the prime mover 52 is operating in a condition that requires high fan speed).

The controller 200 may be configured to receive information from one or more devices (e.g., the first sensor 212, the second sensor 216, the operator interface 40, etc.) and/or to provide information (e.g., notifications, commands, alerts, and the like) to one or more devices (e.g., the climate control system 96, components of the climate control system 96, the variable-speed fan 130, etc.). The controller 200 may be a separate component or may be a component integrated or apart of the climate control system 96 or the vehicle 10. The controller 200 is communicatively coupled to the other devices of the climate control system 96. By way of example, the controller 200 may include a communication interface to facilitate communication with the other devices. In some embodiments, the devices of the controller 200 utilize wired communication (e.g., Ethernet, USB, serial, etc.). In some embodiments, the devices of the controller 200 utilize wireless communication (e.g., Bluetooth, Wi-Fi, Zigbee, cellular communication, satellite communication, etc.). The devices of the controller 200 may communicate over a network (e.g., a local area network, a wide area network, the Internet, a CAN bus, etc.).

In this way, the controller 200 can send signals to the variable-speed fan 130 to control the speed, air-flow rate, noise level (e.g., noise produced, vibration produced, decibel level during operation), and fuel consumed by the variable-speed fan 130. The controller 200 may also receive an indication of a desired temperature. The indication of a desired temperature may be set as a default setting on the controller 200 before installed on the vehicle 10. For example, the indication of the desired temperature may be set at a moderate temperature (e.g., 70, 72, 74 degrees Fahrenheit) such that the controller 200 will reduce the fan speed below the maximum fan speed if possible while maintaining the designated desired temperature. In this way, instead of operating the variable-speed fan 130 at the maximum speed to rapidly set the cab 30 at the desired temperature, the controller 200 may moderate the fan speed to the lower speed (e.g., a speed below the maximum speed or at a minimum speed necessary to maintain the desired temperature). The controller 200 may thus diminish the performance/speed of the climate control system 96 in order to improve operator comfort (e.g., by reducing noise caused by the maximum fan speed) and to improve fuel efficiency of the vehicle 10 by avoiding unnecessarily operating the variable-speed fan 130 at the maximum speed.

In other embodiments, the indication of the desired temperature may be received by input from the operator through the operator interface 40 (e.g., turning a dial to a cool setting, selecting a specific temperature on a touchscreen, etc.). The controller 200 may receive the indication of the desired temperature and determine whether a fan speed lower than maximum fan speed can maintain the desired temperature, even if the desired temperature is not reached as rapidly as if the fan were operating at maximum speed. In this way, the controller may control the variable-speed fan 130 and reduce the speed, airflow rate, etc. of the fan to a speed lower than the maximum fan speed yet still maintain the desired temperature.

The controller 200 is communicatively coupled to the first sensor 212. In some embodiments, the first sensor 212 is a vent-air sensor configured to provide a vent-air information indicative of a condition of the air delivered to the cab 30. For example, the first sensor 212 may be a temperature and humidity sensor configured to provide vent-air information such as the temperature, humidity level, and/or moisture levels of air to be delivered to the cab 30. In another embodiment, the first sensor 212 may include a sensor configured to measure volumetric air flow rate or air flow velocity. The first sensor 212 may be located in the air duct 142, in a vent delivering air to the cab 30, at/downstream of the mixing door 170, or at another suitable location to monitor the conditions of the air entering the cab 30. The controller 200 is configured to receive the vent-air information and may compare the vent-air information from the first sensor 212 to the indication of the desired temperature. By making this comparison, the controller 200 may determine whether air of the desired temperature is entering the cab 30 at a fan speed below the maximum speed. In some embodiments, the controller 200 may store/log the change in temperature/humidity of air detected by the first sensor 212 and calculate whether the vent-air condition is approaching or straying from the desired temperature. Accordingly, in an exemplary embodiment, the controller 200 may determine whether the variable-speed fan 130 is required to operate at a maximum fan speed based on at least the desired temperature and the vent-air information. For example, the controller 200 monitor the vent-air information via the first sensor 212 and lower the speed of the variable-speed fan 130 until the fan is at a minimum speed required to hold the condition of the air delivered to the cab 30 at the desired temperature. In other embodiments, the controller 130 may be pre-programed with an estimate of the thermal boundary conditions of the air conditioning-heating unit 114, receive vent-air information such as volumetric air flow rate, temperature, humidity level, and pressure from the first sensor 212, and determine a fan speed necessary to maintain the desired temperature via a simulation or model of the climate control system 96.

The controller 200 is also configured to determine whether a dehumidifying operation is requested by one or more sub-systems of the vehicle 10, by the operator via the operator interface 40, by the climate control system 96, etc. For example, a dehumidifying operation may include a cab defog operation, a cab dehumidify operation, a cab demist operation, or another operation requested by the operator or by a sub-system that demands maximum fan speed from the variable-speed fan 130. For example, an operator may request a dehumidifying operation by toggling a switch on the operator interface 40 to defog the windshield or windows of the cab 30. Accordingly, the climate control system 96 may adjust the flow of air to be directed at the windshield and demand maximum fan speed from the variable-speed fan 130 to cause cool air to rapidly flow over the windshield to clear the glass. The controller 200 may be regulating the fan speed (e.g. limiting the speed of the variable-speed fan 130 below the maximum speed) before the dehumidify operation is requested. When the dehumidify operation is requested, the controller 200 may receive a signal (e.g., when the defog switch is toggled, when the climate control system 96 activates the dehumidifying operation, etc.) and cease regulating/moderating the speed of the variable-speed fan 130 during the dehumidifying operation. In this way, the controller 200 operates the variable-speed fan 130 at the maximum fan speed during the dehumidifying operation, but begins regulating the speed of the fan once more following the end of the dehumidifying operation.

The controller 200 may thus be configured to regulate the fan speed to a speed lower than the maximum fan speed when no sub-systems of the vehicle 10 are in a state that demand maximum fan speed. (e.g., in response to determining that the variable-speed fan 130 is not required to operate at the maximum fan speed, operate the variable-speed fan 130 below the maximum fan speed). For example, the controller may regulate the fan speed to half of the maximum fan speed to maintain a designated desired temperature of the cab 30. The radiator sub-system may request increased fan speed as the temperature of its components rise. The controller 200 may be programmed to include a temperature threshold of the radiator sub-system such that, when the radiator sub-system is below the temperature threshold, the controller 200 will continue moderating the fan speed. However, if the temperature of the components of the radiator sub-system rise above the temperature threshold, a signal may be sent to the controller 200 (e.g., by the radiator sub-system, by the first sensor 212, etc.) and the controller 200 may determine that maximum fan speed is required. Accordingly, the controller 200 may cease regulating the fan speed and operate the variable-speed fan 130 at maximum speed until maximum fan speed is no longer required.

The controller 200 may also be configured to regulate the fan speed to a speed lower than the maximum fan speed when no dehumidifying operation is requested (e.g., in response to determining that the dehumidifying operation is not requested, operate the variable-speed fan 130 below the maximum fan speed). For example, the controller 200 may regulate the fan speed to half of the maximum fan speed to maintain a designated desired temperature of the cab 30. The controller 200 may detect that a demist setting/switch/operation was selected. Accordingly, the controller 200 may cease regulating the fan speed and operate the variable-speed fan 130 at maximum speed until the dehumidifying operation ends. When the dehumidifying operation ends/is no longer requested, the controller 200 may again operate the variable-speed fan 130 below the maximum fan speed.

In some embodiments, the controller 200 includes a second sensor 216 configured to provide climate control system information regarding the climate control system 96. The second sensor 212 may include temperature sensors configured to measure a temperature at the inlet/outlet of the compressor 102, the condenser 106, the evaporator 120, at the mixing door 170, at lines 118, etc. The second sensor 212 may also include refrigerant/coolant flow rate sensors, pressure sensors, and the like located at the components of the climate control system 96 or in the path of the air cooled/heated by the climate control system 96. The second sensor 212 may also include ambient temperature/humidity sensors to measure the temperature of outside air. In this way, the controller 200 may receive the climate control sensor information (e.g., the operating conditions/efficiency/temperatures/flow rates/etc. of the climate control system 96 and its components). The controller 200 may compare the climate control system information, the air-vent sensor information, and the desired temperature to determine a minimum fan speed necessary deliver air to the cab 30 at the desired temperature. For example, the controller 200 may include models that relate the operating conditions of the climate control system 96 and the conditions of the cab 30, simulations to estimate the thermal boundary conditions and heat transfer rates of the climate control system 96 to the cab 30 based on the logged/stored operating conditions, etc. Accordingly, when maximum fan speed is not required and a dehumidifying operation is not requested, the controller may operate the variable-speed fan 130 at the minimum fan speed necessary to maintain the desired temperature, thus decreasing excessive noise of the fan and improving fan fuel efficiency.

In another embodiment, the controller 200 may be in feedback communication with the climate control system 96 and continuously operate the climate control system 96. For example, ambient temperatures may fluctuate and result in a minimum fan speed necessary to maintain the desired temperature that increases or decreases (e.g., as the outside air cools down, lower fan speed may be required to maintain moderate temperatures of the cab 30). In this way, the controller 200 may constantly communicate with the climate control system 96 (e.g., by constantly regulating/limiting the fan speed to remain at the minimum necessary fan speed as ambient conditions or conditions of the vehicle sub-system change).

Exemplary Methods for Fuel Efficient Automatic Temperature Control

Figure 7:
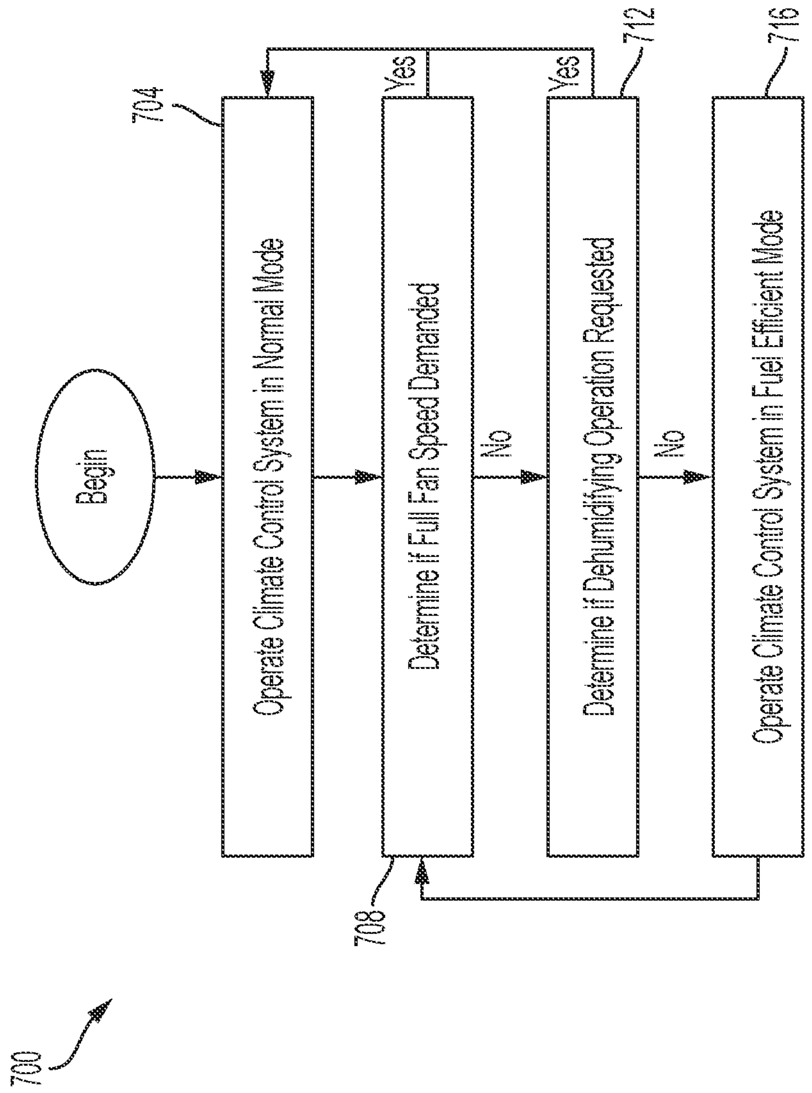
FIG. 7 is a flow diagram showing exemplary steps for a method for fuel efficient automatic temperature control.

Turning to FIG. 7, an exemplary method for fuel efficient automatic temperature control 700 is shown. The may begin upon start up of the vehicle 10 or start up of the climate control system 96. Similarly, the method may end when upon shut-off of the vehicle 10 or the climate control system 96. In some embodiments, the method may end by being toggled off (e.g., by a switch on the operator interface, based on ambient temperatures exceeding a designated temperature threshold, etc.). The method may be performed by an automatic temperature controller 200.

The method includes step 704, operating, by the controller, the climate control system in the normal mode. For example, in this embodiment, upon start up the controller may default to first operating the variable-speed fan 130 of the climate control system 96 at the maximum fan speed for a designated period of time. In this way, the method 700 allows the vehicle 10 to sufficiently cool down the lines, vents, and refrigerant 124 of the refrigeration circuit 101 during a "start-up" or "warm-up" phase. The climate control system 96 may operate in the normal mode (e.g., at a maximum fan speed) for a set period of time such as 2 minutes, 5 minutes, etc., or until the evaporator 120, condenser 106, or first sensor 212 register a designated operational temperature. In other embodiments, climate control system 96 may be operated at maximum fan speed for an instant (e.g., merely to confirm that the variable-speed cooling fan 130 is fully operational).

The method also includes step 708, determining, by the controller, whether the full fan speed is demanded. Similar to the process performed by the controller 200 discussed above, the control may compare, analyze, or use at least the desired temperature and the vent-air information to determine whether the variable-speed fan 130 is required to operate at the maximum fan speed. The controller 200 may also send signals, receive signals, or communicate with sub-systems of the vehicle 10 to determine whether one or more sub-systems are requesting/demanding/require maximum fan speed based on their operating conditions. For example, the controller 200 may be programmed to operate the maximum fan speed in the event that the axle coolers rise above a certain designated temperature threshold. Accordingly, the controller may compare the temperature reading of the axle coolers (e.g., by receiving a signal from another sub-system, by receiving information from the first sensor 212, etc.) and determine if the axle coolers are below or above the designated temperature threshold to determine whether a full-fan speed is demanded. In some embodiments, the operator may demand full fan speed by toggling a setting, switch, knob, or the like on the operator interface 40.

The method also includes step 712, determining, by the controller, whether a dehumidifying operation is requested. As discussed above, the controller may determine that a dehumidifying operation is requested based on signals received from the operator interface or another sub-system. For example, an operator may request a dehumidifying operation by toggling a switch on the operator interface 40 to defog the windshield or windows of the cab 30. The controller 200 may receive a signal from the switch or from the climate control system 96 indicating the request for the dehumidifying operation.

The method further includes step 716, operating, by the controller, the climate control system in a fuel efficient mode. As shown in FIG. 7, the controller 200 operates the variable-speed fan 130 at fan speed below the maximum fan speed after determining that full fan speed is not demanded and after determining that a dehumidifying event is not requested. As shown by the arrow leading from step 716 to step 708, the controller 200 performing the method 700 may continuously update or communicate to determine whether maximum fan speed is required or if a dehumidifying event is requested and operate in the normal mode or fuel efficient mode accordingly. While operating the in fuel efficient mode, the controller 200 may regulate the fan speed below the maximum fan speed to reduce noise, fuel consumption, and vibration. For example, the controller 200 may de-rate the fan to increase vent temperature slightly above the desired operating temperature by a range on 1-2 degrees Fahrenheit in order to increase fuel efficiency at the cost of AC performance.

Figure 8:
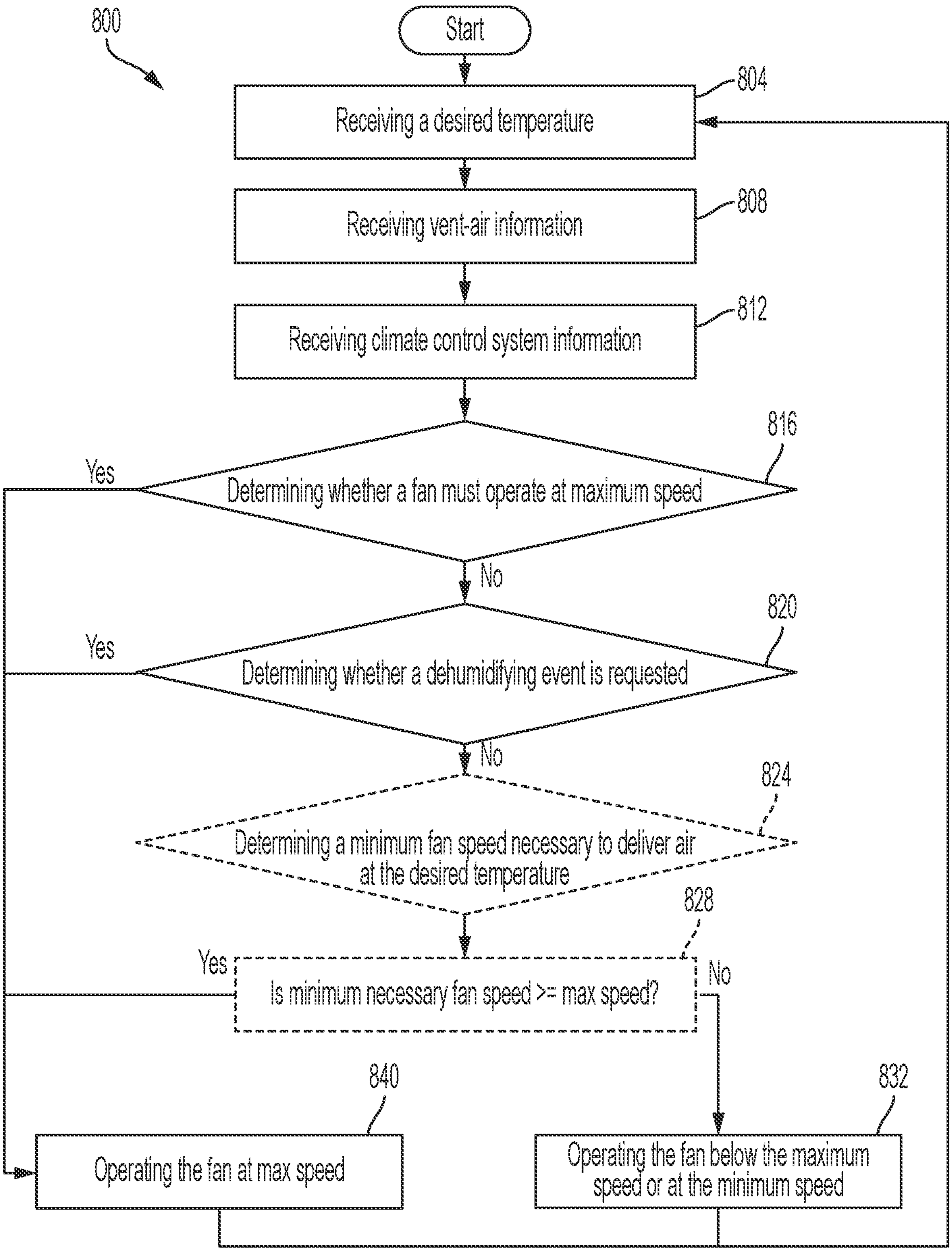
FIG. 8 is a flow diagram showing exemplary steps for an alternative method for fuel efficient automatic temperature control.

Turning to FIG. 8, another exemplary method for fuel efficient automatic temperature control 800 is shown. The method 800 may also begin upon startup of the vehicle 10 or startup of the climate control system 96. Similarly, the method 800 may end when upon shut-off of the vehicle 10 or the climate control system 96. In some embodiments, the method 800 may end by being toggled off (e.g., by a switch on the operator interface 40, based on ambient temperatures exceeding a designated temperature threshold, etc.). The method may be performed by an automatic temperature controller 200.

The method 800 includes step 804, receiving a desired temperature by a controller. As discussed above, the desired temperature may be set as a default setting on the controller 200 before installed on the vehicle 10. For example, the desired temperature may be pre-programmed as a moderate temperature (e.g., 70, 72, 74 degrees Fahrenheit) such that the controller 200 will reduce the fan speed below the maximum fan speed if possible while maintaining the desired temperature. In this way, instead of operating the variable-speed fan 130 at the maximum speed to rapidly set the cab 30 at the desired temperature, the controller 200 may moderate the fan speed to the lower speed (e.g., a speed below the maximum speed or at a minimum speed necessary to maintain the desired temperature). The desired temperature may also be received from an operator interface 40 (e.g., an operator selects a temperature of 70 degrees Fahrenheit on a dial or touch screen). The controller 200 performing the method 800 may store the desired temperature in order to determine whether the fan speed may be modulated to a speed below the maximum speed while still maintaining the desired temperature.

The method 800 includes step 808, receiving vent-air information by the controller. The controller 200 may receive the vent-air information from the first sensor 212. The first sensor 212 may be one or more of a temperature sensor, a humidity sensor, a pressure sensor, or a volumetric flow rate sensor. In some embodiments, the controller 200 performing the method 800 may receive the vent-air information indirectly (e.g., another sub-system or the climate control system 96 may receive the vent-air information then send it to the controller 200). The controller may also receive vent air information from a thermostat of the air conditioning-heating unit 414 (e.g., a built-in sensor of the air conditioner-heating unit 114 in communication with the controller 200). The vent-air information may include temperature readings, pressure readings, volumetric air flow rates, air flow speeds, humidity levels of air, and the like. The air-vent information may provide such information regarding air in the air duct 142, at or downstream of the mixing door 170, or at another suitable location to receive information regarding the condition of the air to be delivered to the cab 30.

The method 800 includes step 812, receiving a climate control sensor information by the controller. The controller 200 may communicate with the climate control system 96, a second sensor 216, or other sub-systems to receive climate control sensor information. Climate control sensor information may include the temperature, pressure, or humidity level at the inlet/outlet of: the compressor 102, the condenser 106, the evaporator 120, the mixing door 170, or the heater core 166. Climate control sensor information may also include temperature, humidity, and pressure measurements of ambient air. In some embodiments, climate control system information may include the flow rate of a refrigerant 124 or coolant in lines 118. At this step 812, the method comprises receiving such climate control system information and may include storing the information in a database, log, or memory (e.g., memory 204).

The method 800 includes step 816, determining, by the controller, whether a variable-speed fan 130 is required to operate at a maximum fan speed. The determination may be based on one or more of the desired temperature, the vent-air information, and the climate control system information. Additionally, the determination may be made based on whether a sub-system of the vehicle 10 is demanding increased or maximum fan speed. For example, the controller 200 may determine that, based on the desired temperature, the ambient temperature, the temperature of the evaporator 120, and the volumetric air flow rate and refrigerant 124 flow rate, only the maximum fan speed or higher can deliver air at the desired temperature into the cab. The controller may make this determination based on models, simulations, or estimations of the thermal boundary conditions of the cab 30, air duct 142, vents, etc. In another example, the controller may receive a signal from the radiator sub-system that components of the radiator, prime mover 52, or the like are exceeding a temperature threshold and need increased fan speed to cool down. Accordingly, the controller 200 may determine that the variable-speed fan 130 must operate at maximum fan speed. As shown in FIG. 8, if at step 816 it is determined that the fan is not required to operate at the maximum fan speed, the method 800 proceeds to step 820.

At step 820, the method 800 includes determining, by the controller, whether a dehumidifying operation is requested. As discussed above, the dehumidifying operation may include a cab defog operation, a cab dehumidify operation, a cab demist operation, or another operation requested by the operator or by a sub-system that demands maximum fan speed from the variable-speed fan 130. The controller may determine that a dehumidifying operation is requested based on signals received from the operator interface 40 or another sub-system. As shown in FIG. 8, if at step 820 the method determines that no dehumidifying operation is requested, the method may optionally proceed to step 824. In some embodiments, where step 824 is not present, if at step 820 the method determines that no dehumidifying operation is requested, the method may proceed to step 832 of operating the variable-speed fan 130 at a speed lower than the maximum fan speed.

The method may optionally include step 824 determining, by the controller, a minimum fan speed necessary to deliver air to the cab 30 of the vehicle 10 at the desired temperature based on at least the air information and the climate control sensor information. At this step, the method 800 may use a model, predictive algorithm, or thermodynamic relationships between the operating conditions of the climate control system 96, ambient air conditions, and vent-air temperature to determine a minimum fan speed necessary to maintain the desired temperature. In this way, the controller 200 may continuously monitor the current operating conditions/parameters of the climate control system 96 (e.g., condenser temperature, evaporator temperature, refrigerant/coolant flow rate, etc.) to update an estimate minimum fan temperature necessary to deliver air of at the desired temperature to the cab 30. For example, if the vehicle 10 runs for an extended period of time, the temperature of the coolant heating air at the heating core may steadily rise, mixing hotter air with the air cooled by the refrigeration circuit 101. The controller may shift the mixing door 170 to vary the mixing ratio of the air, or alternatively, may determine that the minimum fan speed must increase to increase the rate of cool air mixing with the hot air/cooling the coolant lines 126.

Following step 828, the method 800 may optionally include a comparison step 828 by the controller 200. At this comparison step, the controller 200 determines if the minimum necessary fan speed calculated based on at least the vent-air information and the climate control system information is greater than or equal to the maximum fan speed. If so, the method proceeds to step 840 and the controller simply defaults to operating the variable-speed fan 130 at the maximum fan speed. However, if the minimum necessary fan speed calculated based on at least the vent-air information and the climate control system information is less than the maximum fan speed, the method may proceed to step 832 and the variable-speed fan 130 is regulated (e.g., the controller operates the fan at a speed lower than the maximum fan speed or equal to the minimum fan speed necessary to maintain the desired temperature).

As utilized herein with respect to numerical ranges, the terms “approximately,” “about,” “substantially,” and similar terms generally mean+/−10% of the disclosed values, unless specified otherwise. As utilized herein with respect to structural features (e.g., to describe shape, size, orientation, direction, relative position, etc.), the terms “approximately,” “about,” “substantially,” and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

References herein to the positions of elements (e.g., “top,” “bottom,” “above,” “below”) are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 92, the climate control system 96, etc.) as shown in the various exemplary embodiments is illustrative only. Additionally, any element disclosed in one embodiment may be incorporated or utilized with any other embodiment disclosed herein.

What is claimed is:

1. A fuel efficient automatic temperature control system for a vehicle, the system comprising:
- a climate control system configured to heat or cool air delivered to a cab of the vehicle, the climate control system including:
  - a condenser,
  - a variable-speed fan operable at a fan speed and configured to blow air across the condenser to dissipate heat from the condenser, and
  - a blower separate from the variable-speed fan and configured to deliver heated or cooled air to the cab of the vehicle;
- a first sensor configured to provide a vent-air information indicative of a condition of the air delivered to the cab;
- an automatic temperature controller, the automatic temperature controller comprising one or more processors including one or more memory devices coupled to the one or more processors, the one or more memory devices configured to store instructions thereon that, when executed by the one or more processors, cause the one or more processors to:
  - receive an indication of a desired temperature,
  - receive the vent-air information,
  - determine whether the variable-speed fan is required to operate at a maximum fan speed based on at least the desired temperature and the vent-air information,
  - determine whether a dehumidifying operation is requested,
  - in response to determining that the variable-speed fan is required to operate at the maximum fan speed or that the dehumidifying operation is requested, operate the variable-speed fan at the maximum fan speed, and
  - in response to determining that the variable-speed fan is not required to operate at the maximum fan speed and that the dehumidifying operation is not requested, operate the variable-speed fan below the maximum fan speed.

2. The system of claim 1, wherein the one or more processors are in feedback communication with the climate control system and continuously operate the climate control system.

3. The system of claim 1, further comprising:
- a second sensor configured to provide climate control system information,
- wherein the one or more processors are further configured to:

receive the climate control system information; and determine a minimum fan speed necessary to heat or cool the air delivered to the cab at the desired temperature based on at least the vent-air information and the climate control system information.

4. The system of claim 3, wherein the one or more processors are further configured to:

in response to determining that the variable-speed fan is not required to operate at the maximum fan speed and that the dehumidifying operation is not requested, operate the variable-speed fan at the minimum fan speed.

5. The system of claim 1, wherein the indication of the desired temperature comprises at least one of:

a pre-set temperature stored on the automatic temperature controller or a temperature value selected via an operator interface.

6. The system of claim 1, wherein the first sensor includes a temperature sensor and a humidity sensor, and the vent-air information includes a temperature and a humidity level of the air to be delivered to the cab.

7. The system of claim 1, wherein the dehumidifying operation comprises at least one of a defog operation or a demist operation.

8. The system of claim 3, wherein the climate control system information comprises at least one of:

a temperature at the inlet and outlet of a compressor, the condenser, or an evaporator;

a pressure at the inlet and outlet of the compressor, the condenser, or the evaporator;

a refrigerant flow rate; or an ambient temperature or humidity level.

* * * * *